United States Patent [19]
Nissato

[11] Patent Number: 5,539,905
[45] Date of Patent: Jul. 23, 1996

[54] MAP/FACILITY EXCLUSION CONTROL SYSTEM FOR UPDATING FACILITY ON A MAP

[75] Inventor: Hiroyuki Nissato, Kawasaki, Japan

[73] Assignee: Fujitsu Limited, Kawasaki, Japan

[21] Appl. No.: 429,465

[22] Filed: Apr. 27, 1995

Related U.S. Application Data

[63] Continuation of Ser. No. 888,755, May 27, 1992, abandoned.

[30] Foreign Application Priority Data

May 27, 1991 [JP] Japan .................................. 3-121056

[51] Int. Cl.⁶ .................................................. G06F 13/00
[52] U.S. Cl. .............. 395/600; 395/200.08; 395/200.03; 395/200.18; 395/839; 395/882; 395/182.16; 364/DIG. 1; 364/282.1; 364/247.5; 364/260.8
[58] Field of Search .............................. 395/600, 200.08, 395/200.03, 200.18, 839, 882, 182.16; 364/DIG. 1

[56] References Cited

U.S. PATENT DOCUMENTS

| | | | |
|---|---|---|---|
| 3,670,310 | 6/1972 | Bharwani et al. | 340/172.5 |
| 4,605,820 | 8/1986 | Campbell, Jr. et al. | 178/22.09 |
| 4,833,597 | 5/1989 | Wakayama et al. | 364/200 |
| 4,933,971 | 6/1990 | Bestock et al. | 384/44 |
| 4,934,823 | 6/1990 | Okami | 364/200 |
| 5,012,405 | 4/1991 | Nishikado et al. | 364/200 |
| 5,081,608 | 1/1992 | Tamura et al. | 395/600 |
| 5,241,639 | 8/1993 | Feldbrugge | 395/425 |
| 5,247,665 | 9/1993 | Matsuda et al. | 395/600 |
| 5,257,365 | 10/1993 | Powers et al. | 395/600 |

*Primary Examiner*—Thomas G. Black
*Assistant Examiner*—Jean R. Homere
*Attorney, Agent, or Firm*—Staas & Halsey

[57] ABSTRACT

A design extraction section of a terminal extracts a map in the range instructed by display of the latest facility drawing, generates a unique facility exclusion key from a key value of the facility instructed on the map and a record name of the relevant facility, acquires exclusion by sending such exclusion key to the host through the transmission line and stores the key in the facility exclusion managing DB, updates the facility on the map in the terminal corresponding to the message informing acquisition of exclusion and resets exclusion of the facility exclusion managing DB after sending the updated facility to the host to update the facility DB to be managed uniquely.

2 Claims, 3 Drawing Sheets

EXAMPLE OF MAP EXCLUSION

☐ : DIVISION ON THE MAP
○△ : FACILITY

EXAMPLE OF FACILITY EXCLUSION

☐ : DIVISION ON THE MAP
○△ : FACILITY

MAP/FACILITY EXCLUSION CONTROL SYSTEM FOR UPDATING FACILITY ON A MAP

This application is a continuation of application Ser. No. 07/888,755, filed May 27, 1992, now abandoned.

BACKGROUND OF THE INVENTION

1. Field of the Invention

The present invention relates to a map/facility exclusion control system for controlling exclusion of facility on a map. An electrical power company manages facilities and maps by recording power facilities on maps. The design and maintenance jobs are required to realize delicate exclusion control for update by a plurality of terminals in order to manage the latest facilities on maps. Therefore, a system for simultaneously and effectively processing a plurality of map DBs incorporated to the facility DB is necessary.

2. Description of the Related Art

In the case of updating a facility on a map (for example, a pole at a certain point), update has been realized by exclusion control on the drawing (map number=reduction scale+division+element) as the minimum storing unit of a map.

Since the design and maintenance jobs update both facility DB and map DB as explained above, exclusion is carried out in unit of map, thereby resulting in a problem that the waiting time for exclusion is generated for updating the same map with different installations.

SUMMARY OF THE INVENTION

It is therefore an object of the present invention that a facility exclusion key is generated from a record name of facility DB and a key of facility, thereby exclusion control is made based on this key and other facilities in the same map are updated simultaneously.

The above-mentioned and other objects and features of the present invention will become more apparent from the following description when read in conjunction with the accompanying drawings. However, the drawings and descriptions are merely illustrative in nature and not restrictive.

DESCRIPTION OF THE PREFERRED EMBODIMENTS

A means for solving the problems is explained with reference to FIG. 1.

Figure 1:
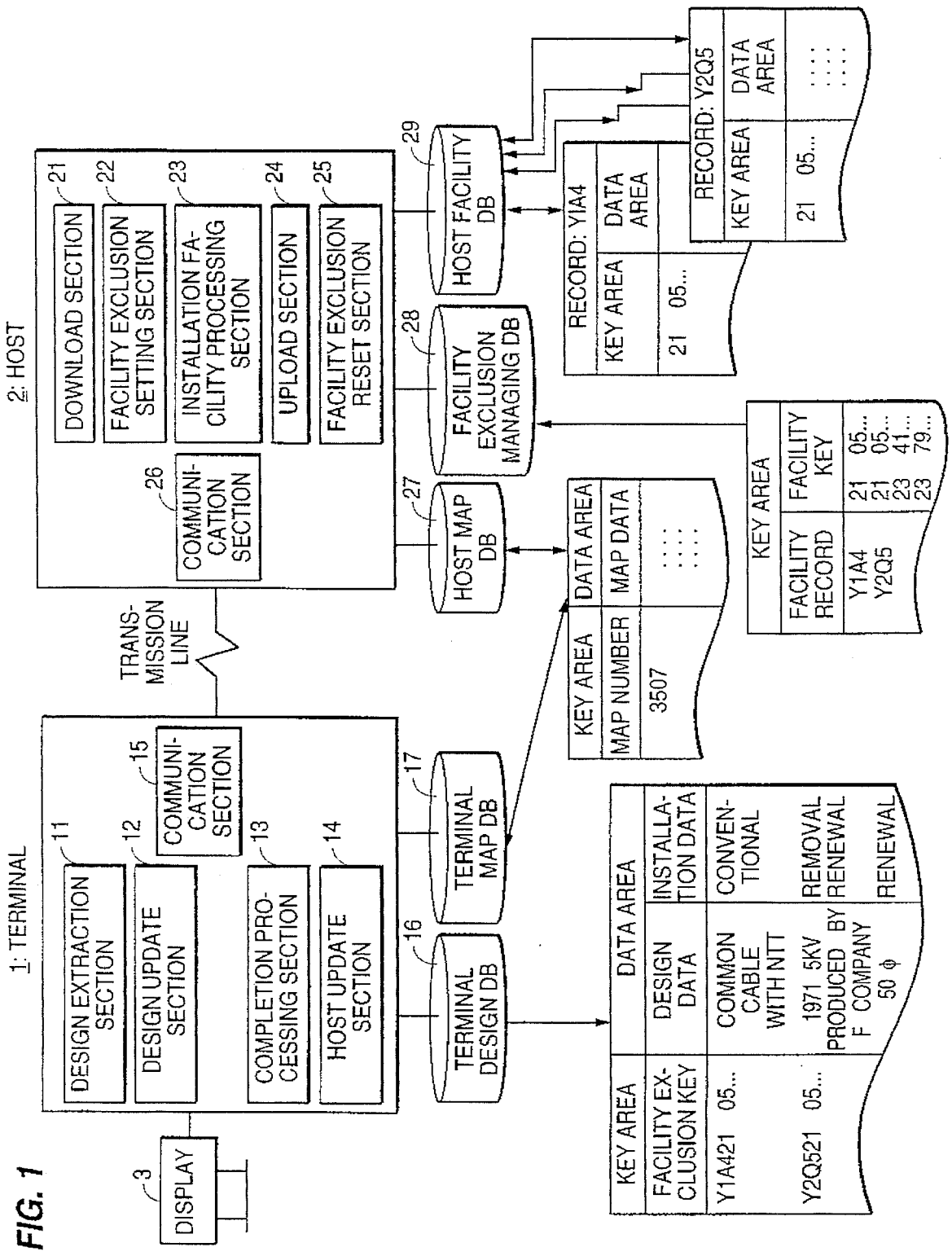
FIG. 1 is a structural diagram of an embodiment of the present invention.

In FIG. 1, the terminal 1 updates a facility on a map.

The design extraction section 11 extracts a map in the range instructed from the latest facility diagram and generates a unique facility exclusion key from a key value of the facility instructed on the map and a record name of the relevant facility.

A host 2 integrally and uniquely manages update of facility from a plurality of terminals 1 connected through the transmission line.

A facility exclusion managing DB 28 uniquely manages update of facility by storing a facility exclusion key.

As shown in FIG. 1, the design extraction section 11 of the present invention extracts a map in the indicated range by displaying the latest facility diagram, generates a unique facility exclusion key from a key value of the facility indicated on the map and a record name of the facility, informs such key to the host 2 through the transmission line and stores it in the facility exclusion managing DB 28 to acquire the exclusion, updates the facility on the map in the terminal 1 corresponding to such information and resets the exclusion of said facility exclusion managing DB 28 after updating the uniquely managed facility DB by sending a message to inform such update to the host 2.

Therefore, exclusion control is carried out based on the unique facility exclusion key of the system generated from a record name of the facility DB and a key value of facility and the other facility in the same map can be updated simultaneously.

A concept of the present invention is explained first with reference to FIG. 2.

Figure 2A:
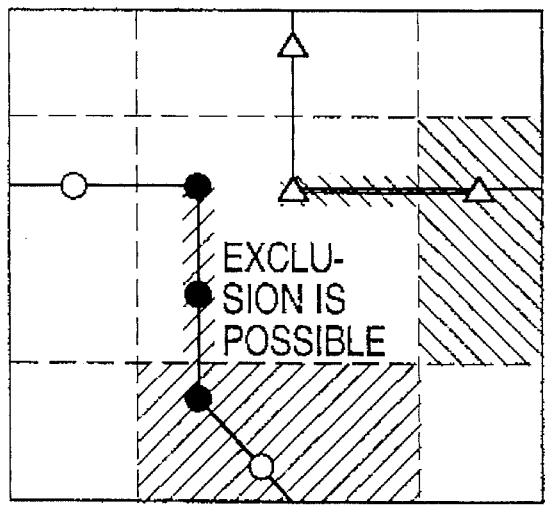
FIG. 2 is a diagram for explaining the concept of the present invention.

FIG. 2(a) illustrates an example of map exclusion. Here, in the case where a certain terminal updates the facility indicated by a circle (o) (for example, a pole) by acquiring exclusion for the division of a map (drawing) indicated by a dotted line at the center, if it is attempted to update the facility indicated by a triangle (Δ) by the other terminal, exclusion of the division in the map (drawing) indicated by the dotted line at the center cannot be acquired and it cannot be updated simultaneously. Therefore, update is carried out after the reset of exclusion.

Figure 2B:
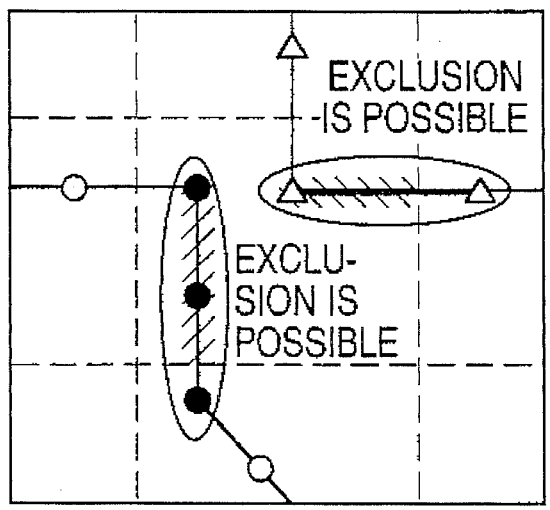

Meanwhile, in the case of the example of facility exclusion of FIG. 2(b) of the present invention, when a certain terminal is updating the facility indicated by the circle (o) for which exclusion is acquired on the division of map (drawing) indicated by the dotted line at the center, the other terminal acquires exclusion of the facility indicated by a triangle (Δ) and can update this facility on the division of the same map (drawing). The embodiment of the present invention will be explained hereunder in detail sequentially with reference to FIG. 1 and FIG. 3.

In FIG. 1, a terminal 1 updates facility on a map and comprises, for example, the units 11 to 15.

Figure 3:
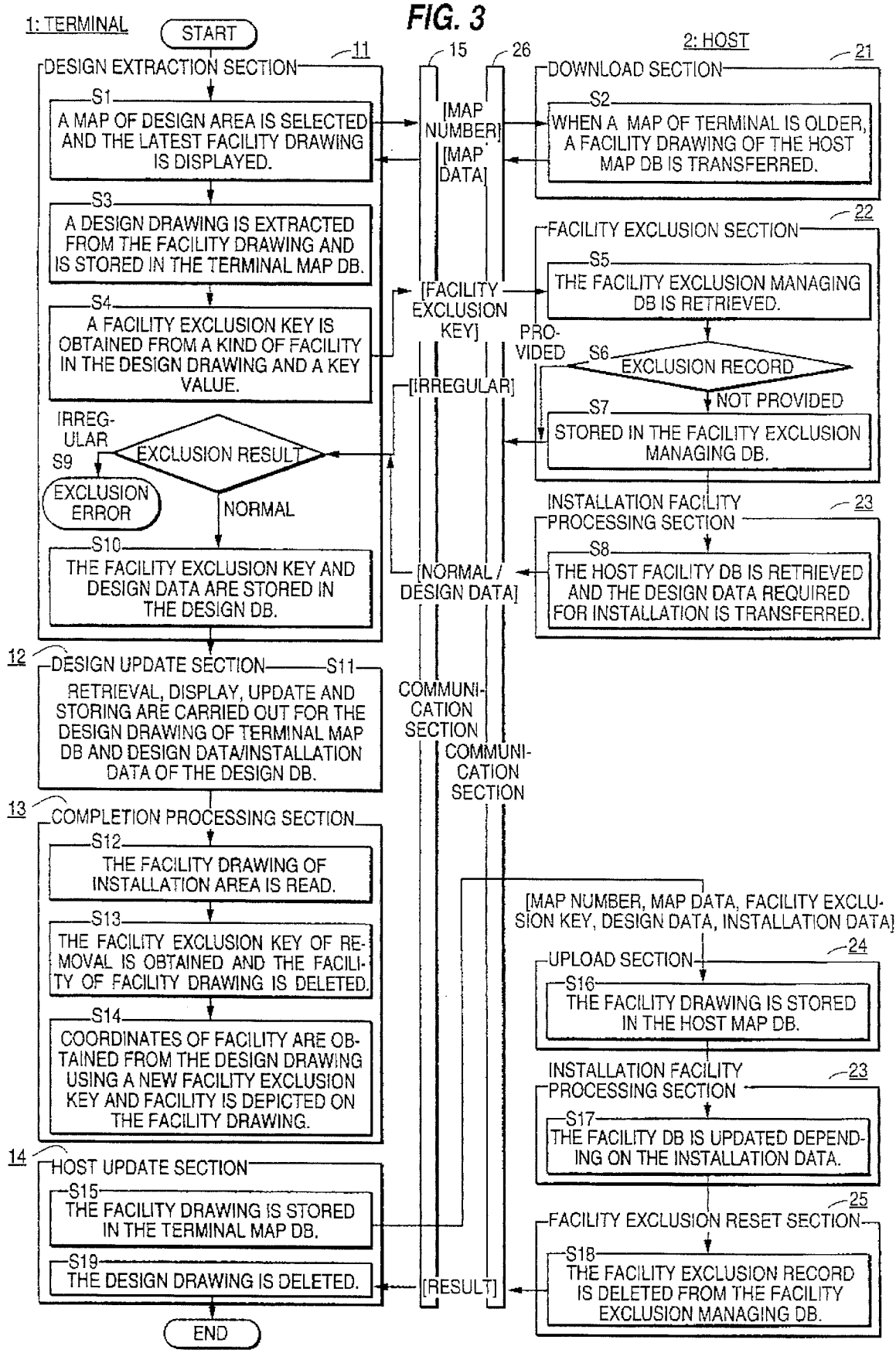
FIG. 3 is a flowchart for explaining operations of the present invention.

The design extraction section 11 extracts a map in the indicated range from the latest facility map to individually manage the map as the design map and generates a unique facility exclusion key in the system from a key value of the facility instructed on the map and a record name of the relevant facility (refer to the processing flowchart of the design extraction section 11 of FIG. 3). Since a key value of the facility in the record of facility DB is determined uniquely in the relevant record but it is not always unique for the other records, a facility exclusion key of the unique facility in the system is generated in the present invention based on the record name and key of facility in the record.

A design update section 12 executes retrieval, display, update and storing for the design drawing and design data/installation data on the map (refer to the processing flowchart of design update section 12 of FIG. 3).

A completion processing section 13 reads design drawings of installation areas after update by the design update section 12, remove the facility from the facility diagram by obtaining exclusion facility key for removal or depicting facilities in the facility diagram by obtaining the newly obtained exclusion facility key (refer to the processing flowchart of the completion processing section 13 of FIG. 13).

A host update section 14 stores the updated facility diagram in the terminal map DB 17 and in the host facility DB 29 (refer to the processing flowchart of the host update section 14 of FIG. 3).

A communication section 15 transmits or receives data to or from the communication section 26 in the host 2 through the transmission line.

A terminal design DB 16 stores and reserves design data and installation data in the terminal 1.

A terminal map DB 17 stores and reserves maps in the terminal 1.

The host 2 integrates and uniquely manages facilities on the maps transmitted from a plurality of terminals connected through the transmission line.

A download section 21 extracts the latest map data from the host map DB 27 and downloads the map to the terminal 1 through the transmission line (refer to the processing flowchart of the download section 21 of FIG. 3).

A facility exclusion setting section 22 retrieves the host exclusion managing DB concerning the facility exclusion key informed from the terminal 1 and sets exclusion when it is not set and informs a message to the terminal 1 (refer to the processing flowchart of the facility exclusion setting section 22 of FIG. 3).

An installation facility processing section 23 retrieves the host facility DB 29 and transfers the design data required for installation to the terminal 1 (refer to the processing flowchart of the installation facility processing section 23 of FIG. 3).

An upload section 24 stores facility drawings (maps) transferred to the terminal 1 to the host map DB 2 7.

A facility exclusion reset section 25 deletes records having the facility exclusion key transferred from the facility exclusion managing DB 28 and resets exclusion.

A communication section 26 transmits and receives data to and from the communication section 15 of the terminal 1 through the transmission line.

The host map DB 27 stores map data which are uniquely managed in the host 2.

The facility exclusion managing DB 28 stores facility exclusion key (record name of facility DB+key value of facility) and manages exclusion of facility.

The host facility DB 29 stores facilities on maps.

Next, operations for updating facilities on maps by the terminal 1 in the structure of FIG. 1 will be explained in detail in the sequence of the flowchart of FIG. 3.

In FIG. 3, a map of design area is selected and the latest facility drawing is displayed in the step S1. Namely, the design extraction section 11 of FIG. 1 displays the latest facility drawing of the design area selected on the display 3. In this case, a map number and a version number are sent to the host 2 for updating the map when this map is not the latest one stored in the terminal map DB 17.

In the step S2, when a map in the terminal 1 is older, the facility drawing of the host map DB 27 is transferred. In the case where a terminal version number of the map number (reduction scale+division+element) received from the terminal 1 in the step S1 is older than the host version number read from the host map DB 27, the latest map and version number read from the host map DB 27 are transferred to the terminal 1. The terminal map DB 17 is updated to the latest map (facility drawing) and version number.

Design drawings are extracted from the facility drawing and only the required design drawing is stored in the terminal map DB 17 in the step S3.

In the step S4, a facility exclusion key is obtained from a kind (record name) and a key value of the facility in the design drawing (refer to the facility exclusion key of the lower part of the terminal design DB 16 of FIG. 1). Namely, a facility exclusion key of the unique facility in the system is obtained with the record name of host facility DB 29 and key value (unique only in the record) of the facility in the record. The obtained exclusion key of the unique facility in the system is sent to the host 2 through the transmission line.

In the step S5, the facility exclusion section 22 retrieves the facility exclusion managing DB 28. In the step S6, existence or not existence of the same facility exclusion record is determined by the retrieval in the step S5. When the same facility exclusion record exists, since the terminal 1 already acquires exclusion for this facility exclusion key, irregular condition is informed to the terminal 1. When it does not exist, this facility exclusion key is stored in the facility exclusion managing DB 28 and exclusion is set in the step S7. In the step S8, the installation facility processing section 23 retrieves the host facility DB 29 and transfers the design data required for installation to the terminal 1 (in this case, normality of exclusion is also informed to the terminal 1).

Result of exclusion is determined in the terminal 1 in the step S9. Only when exclusion is normal, the processing of the step S10 and successive steps are executed. In the case where exclusion is irregular, processing is completed as a result of exclusion error (the facility exclusion key is already acquired by the other terminal 1).

In the step S10, the facility exclusion key and design data are stored in the terminal design DB 16.

In the step S11, the design update section 12 conducts retrieval, display, update and storing for the design drawing of terminal map DB 17 and design data/installation data of the terminal design DB 16. Thereby, as indicated in FIG. 2(b), the facility is updated on the map and the result of update are stored under the condition that facility exclusion is acquired.

The completion processing section 13 reads the design drawing of the installation area in the step S12.

The facility exclusion key for removal is obtained and the facility on the facility drawing is deleted in the step S13.

A new facility exclusion key is obtained, coordinates of facility are obtained from the design drawing and the facility is depicted on the facility drawing in the step S14.

In the step S15, the host update section 14 stores the facility drawing (map) in the terminal map DB 17 and issues the request to the host 2 to store the map number, map data, design exclusion key, design data and installation data by sending these data.

The upload section 24 stores the facility drawing in the host map DB 27 in the step S16.

The installation facility processing section 23 updates the host facility DB 29 in accordance with the installation data in the step S17.

The facility exclusion reset section 25 deletes the facility exclusion record from the facility exclusion managing DB 28 in the step S18. Thereafter, the result is informed to the terminal 1.

In the step S19, the host update 14 of the terminal 1 deletes the design drawing, completing a series of the facility update processing.

With the processing described above, the design extraction section 11 displays the latest facility drawing of the design area (the transferred latest facility drawing when the map number and version number are sent to the host 2 and these are found to be older than those in the host), obtains the unique facility exclusion key of the system from the record name (kind of facility) of the facility DB and key value of facility from the displayed facility drawing, acquires exclusion by informing such facility exclusion key to the host 2 and receives transmission of the design data required for installation, conducts update such as removal and addition of facilities on the map (facility drawing) based on such design data and then resets exclusion by reflecting the result (removal and addition, etc.) on the terminal map DB 176, host facility DB 29 and the host map DB 27.

As described above, since the present invention employs a structure for executing exclusion control on the basis of the unique facility exclusion key in the system generated from the record name of facility DB and key value of the facility, another element (another facility) in the division of the same map can be simultaneously updated from a plurality of terminals and delicate update control can also be realized for map DB and facility DB. Moreover, procedures and processing can be simplified because the map data is formed by extracting the part required for installation from the facility drawing as the design drawing.

While the invention has been illustrated and described in great detail in the drawings and foregoing description, it will be recognized that many changes and modifications will occur to those skilled in the art. It is therefore intended, by the appended claims to cover any such changes and modifications as fall within the true spirit and scope of the invention.

I claim:

1. A facility map exclusion control apparatus for controlling update processes of one of facilities stored in a single file sequentially, among a plurality of terminals connected to said apparatus, said facility map exclusion control apparatus comprising:

facility map, having a plurality of facilities stored in a single file, facility exclusion managing database (DB) containing facility exclusion keys currently assigned for each facility, exclusion key managing means for assigning an exclusion key corresponding to one of said facilities to a single terminal which requests an update process of said facility, by storing said assigned exclusion key in said facility exclusion managing DB and transmitting said assigned exclusion key to said terminal, only after confirming that exclusion key corresponding to said facility is not stored in said facility exclusion managing DB, update processing means for updating said facility in said single file only when the terminal requesting said update process has said exclusion key corresponding to said facility, and exclusion reset means for deleting the exclusion key from said facility exclusion managing DB, after the update process of the corresponding facility is finished by said update processing means.

2. A map/facility exclusion control system according to claim 1, wherein the latest map and version numbers are transferred to the terminal when the terminal sends a map number and a version number of a facility diagram and such numbers are found not to be the latest numbers.

* * * * *

UNITED STATES PATENT AND TRADEMARK OFFICE
CERTIFICATE OF CORRECTION

PATENT NO. : 5,539,905
DATED : July 23, 1996
INVENTOR(S) : Hiroyuki NISSATO

It is certified that error appears in the above-indentified patent and that said Letters Patent is hereby corrected as shown below:

Col. 1, line 24, change "number=reduction" to --number = reduction";
line 25, change "scale+division+element" to --scale + division + element--.

Col. 2, line 28, change "(o)" to --(0)--;
line 38, change "(o)" to --(0)--.

line 48, change "DB+key" to --DB + key--.

Signed and Sealed this

Seventeenth Day of December, 1996

Attest:

BRUCE LEHMAN

Attesting Officer          Commissioner of Patents and Trademarks